(12) United States Patent
Kim et al.

(10) Patent No.: US 11,598,847 B2
(45) Date of Patent: Mar. 7, 2023

(54) LIDAR APPARATUS AND METHOD OF OPERATING THE SAME

(71) Applicants: SAMSUNG ELECTRONICS CO., LTD., Suwon-si (KR); GWANGJU INSTITUTE OF SCIENCE AND TECHNOLOGY, Gwangju (KR)

(72) Inventors: Jungwoo Kim, Hwaseong-si (KR); Youngjoon Jo, Gwangju (KR); Kyihwan Park, Gwangju (KR)

(73) Assignees: SAMSUNG ELECTRONICS CO., LTD., Suwon-si (KR); GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 779 days.

(21) Appl. No.: 16/554,033

(22) Filed: Aug. 28, 2019

(65) Prior Publication Data

US 2020/0225325 A1    Jul. 16, 2020

(30) Foreign Application Priority Data

Jan. 15, 2019    (KR) .................. 10-2019-0005226

(51) Int. Cl.
  *G01S 7/48*    (2006.01)
  *G01S 7/486*    (2020.01)
  (Continued)

(52) U.S. Cl.
  CPC .......... *G01S 7/4808* (2013.01); *G01S 7/4861* (2013.01); *G01S 17/10* (2013.01)

(58) Field of Classification Search
  None
  See application file for complete search history.

(56) References Cited

U.S. PATENT DOCUMENTS 3,706,989 A * 12/1972 Taylor, Jr. ........... G01S 13/5242
  342/194
8,354,928 B2    1/2013 Morcom
(Continued)

FOREIGN PATENT DOCUMENTS

JP    2010-509693 A    3/2010
JP    6073786 B2    2/2017

OTHER PUBLICATIONS

X. Mao, D. Inoue, H. Matsubara and M. Kagami, "Demonstration of In-Car Doppler Laser Radar at 1.55 $ \mu\hbox{m}$ for Range and Speed Measurement," in IEEE Transactions on Intelligent Transportation Systems, vol. 14, No. 2, pp. 599-607, Jun. 2013, doi: 10.1109/TITS.2012.2230325.*

(Continued)

*Primary Examiner* — Mohammad J Rahman
(74) *Attorney, Agent, or Firm* — Sughrue Mion, PLLC

(57) ABSTRACT

A light detection and ranging (LiDAR) apparatus and a method of operating the LiDAR apparatus are provided. The LiDAR apparatus includes a light transmitter configured to irradiate a laser pulse towards an object, the laser pulse being generated based on a reference signal; a light receiver configured to receive the laser pulse reflected from the object and configured to obtain a first signal from the received laser pulse; and at least one processor configured to convert the first signal and the reference signal respectively into unipolar signals and configured to detect a flight time of the laser pulse based on a correlation between the converted first signal and the converted reference signal.

14 Claims, 6 Drawing Sheets

(51) Int. Cl.
*G01S 17/10* (2020.01)
*G01S 7/4861* (2020.01)

(56) References Cited

U.S. PATENT DOCUMENTS

| | | | |
|---|---|---|---|
| 9,182,492 B2 | 11/2015 | Godbaz et al. | |
| 9,995,820 B2 | 6/2018 | Jachmann et al. | |
| 2004/0039283 A1* | 2/2004 | Banjanin | G01S 7/52047 600/437 |
| 2004/0208233 A1* | 10/2004 | Dafesh | H04J 14/005 375/147 |
| 2006/0087471 A1* | 4/2006 | Hintz | F41H 11/136 342/90 |
| 2012/0203114 A1* | 8/2012 | Bechtel | A61B 5/0075 600/476 |
| 2013/0258312 A1* | 10/2013 | Lewis | G01S 7/4865 356/4.01 |
| 2014/0138518 A1* | 5/2014 | Hammes | G01V 8/10 250/206 |
| 2015/0204978 A1* | 7/2015 | Hammes | G01S 13/10 356/5.01 |
| 2016/0051231 A1* | 2/2016 | Kondo | A61B 8/54 600/438 |
| 2016/0341664 A1* | 11/2016 | Rothberg | H01L 27/14603 |
| 2016/0344156 A1* | 11/2016 | Rothberg | H01S 3/1305 |
| 2018/0172575 A1* | 6/2018 | Bassler | G01N 21/64 |
| 2018/0188358 A1 | 7/2018 | Li et al. | |
| 2019/0094345 A1* | 3/2019 | Singer | G01S 17/42 |
| 2020/0150272 A1* | 5/2020 | Stevenson | G01S 17/26 |
| 2021/0072382 A1* | 3/2021 | Kashmiri | G01S 17/26 |
| 2021/0149028 A1* | 5/2021 | Gong | G01S 17/10 |
| 2021/0166541 A1* | 6/2021 | Xi | G06K 9/6286 |
| 2021/0199553 A1* | 7/2021 | Xi | G01N 15/06 |

OTHER PUBLICATIONS

Levanon, "Noncoherent pulse compression," in IEEE Transactions on Aerospace and Electronic Systems, vol. 42, No. 2, pp. 756-765, Apr. 2006, doi: 10.1109/TAES.2006.1642589.*

Grodensky, "Laser ranging using incoherent pulse compression techniques", Ph.D. Thesis, Bar-Ilan University, Oct. 2014.*

Kilpela, A., "Pulsed Time-of-Flight Laser Range Finder Techniques for Fast, High Precision Measurement Applications", 2004, University of Oulu, 98 pages total.

* cited by examiner

LIDAR APPARATUS AND METHOD OF OPERATING THE SAME

CROSS-REFERENCE TO RELATED APPLICATION

This application claims priority from Korean Patent Application No. 10-2019-0005226, filed on Jan. 15, 2019, in the Korean Intellectual Property Office, the disclosure of which is herein incorporated by reference in its entirety.

BACKGROUND

1. Field

The present disclosure relates to a light detection and ranging (LiDAR) apparatuses and methods of operating the LiDAR apparatuses.

2. Description of the Related Art

A light detection and ranging (LiDAR) apparatus is applied to various fields, for example, aerospace planes, geology, three-dimensional maps, automobiles, robots, drones, etc. The LiDAR apparatus uses a Time of Flight (ToF) of light as a basic operation principle. For example, the LiDAR apparatus may irradiate light towards an object, receive light reflected from the object by using a sensor, and measure a flight time of light by using a high speed electric circuit. Also, the LiDAR apparatus may compute a distance to an object based on the flight time and may generate a depth image with respect to the object by using the computed distance for each location of the object.

In order for the LiDAR apparatus to accurately process a depth image even in a noisy environment or under a condition that a measuring signal is a small signal, there is a demand for a technique for accurately obtaining a flight time of light.

SUMMARY

One or more example embodiments provide LiDAR apparatuses that are capable of accurately obtaining a flight time of light, and methods of operating the LiDAR apparatuses.

Additional aspects will be set forth in part in the description which follows and, in part, will be apparent from the description, or may be learned by practice of the presented embodiments.

According to an aspect of an example embodiment, provided is a light detection and ranging (LiDAR) apparatus, including a light transmitter configured to irradiate a laser pulse towards an object, the laser pulse being generated based on a reference signal; a light receiver configured to receive the laser pulse reflected from the object and configured to obtain a first signal from the received laser pulse; and at least one processor configured to convert the first signal and the reference signal respectively into unipolar signals and configured to detect a flight time of the laser pulse based on a correlation between the converted first signal and the converted reference signal.

The LiDAR apparatus may further include a high-pass filter configured to remove an offset from the first signal; and an analog-digital converter (ADC) configured to quantize the first signal from which the offset is removed, wherein the at least one processor is further configured to convert the first signal into a unipolar signal based on an absolute value of at least a portion of signal values representing the quantized first signal.

The at least one processor may be further configured to convert the reference signal into a unipolar signal based on an absolute value of at least a portion of signal values representing the reference signal.

The at least one processor may be further configured to obtain a cross correlation function between the converted first signal and the converted reference signal, and detect the flight time based on a time period from a time point at which the laser pulse generated based on the reference signal is irradiated towards the object to a time point at which a value of the cross correlation function exceeds a preset critical value.

The at least one processor may be further configured to obtain the cross correlation function between the converted first signal and the converted reference signal by using the following equation: $\int_{-\infty}^{\infty} f(x)g(t+x)dx$, wherein $f(t)$ denotes the converted first signal and $g(t)$ denotes the converted reference signal.

In response to non-existence of the time point at which the value of the cross correlation function exceeds the preset critical value, the at least one processor may be further configured to increase an intensity of the reference signal.

In response to non-existence of the time point at which the value of the cross correlation function exceeds the preset critical value, the at least one processor may be further configured to: control the light transmitter to irradiate laser pulses a plurality of times towards the object, obtain a plurality of first signals from the laser pulses reflected from the object, and detect the flight time of the laser pulse based on the plurality of first signals.

The light transmitter may include a photo-detector configured to obtain the first signal by converting the received laser pulse into an electrical signal.

The photo-detector may include at least one of an avalanche photo-diode (APD) and a single photo avalanche diode (SPAD).

The at least one processor may be further configured to obtain a distance to the object by using the detected flight time and a velocity of light.

According to another aspect of an example embodiment, provided is a method of operating a light detection and ranging (LiDAR) apparatus, the method including: irradiating a laser pulse towards an object, the laser pulse being generated based on a reference signal; obtaining a first signal from the laser pulse reflected from the object; converting the first signal and the reference signal respectively into unipolar signals; and detecting a flight time of the laser pulse based on a correlation between the converted first signal and the converted reference signal.

The converting may include: removing an offset from the first signal by using a high-pass filter; quantizing the first signal from which the offset is removed by using an analog-digital converter (ADC); and converting the first signal into a unipolar signal based on an absolute value of at least a portion of signal values representing the quantized first signal.

The detecting may include: obtaining a cross correlation function between the converted first signal and the converted reference signal; determining a time point at which a value of the cross correlation function exceeds a preset critical value; and detecting the flight time based on a time period from a time point at which the laser pulse generated based on the reference signal is irradiated towards the object to the time point at which the value of the cross correlation function exceeds the preset critical value.

The method may further include increasing an intensity of the reference signal in response to non-existence of the time point at which the value of the cross correlation function exceeds the preset critical value.

The method may further include irradiating laser pulses a plurality of times towards the object in response to non-existence of the time point at which the value of the cross correlation function exceeds the preset critical value; obtaining a plurality of first signals from the laser pulses reflected from the object; and detecting the flight time of the laser pulse by using the plurality of first signals.

According to still another aspect of an example embodiment, provided is a non-transitory computer readable storage medium having stored therein one or more instructions that are executable by a processor, to perform: obtaining a first signal from a laser pulse irradiated to and reflected from an object, the laser pulse being generated based on a reference signal; converting the first signal and the reference signal respectively into unipolar signals; and detecting a flight time of the laser pulse based on a correlation between the converted first signal and the converted reference signal.

BRIEF DESCRIPTION OF THE DRAWINGS

The above and/or other aspects will be more apparent by describing certain example embodiments with reference to the accompanying drawings, in which.

DETAILED DESCRIPTION

Terminologies used herein are selected as commonly used by those of ordinary skill in the art in consideration of functions of the current embodiment, but may vary according to the technical intention, precedents, or a disclosure of a new technology. Also, in particular cases, some terms are arbitrarily selected by the applicant, and in this case, the meanings of the terms will be described in detail at corresponding parts of the specification. Accordingly, the terms used in the specification should be defined not by simply the names of the terms but based on the meaning and contents of the whole specification.

Throughout the specification, it will be understood that when a unit is referred to as being "connected" to another element, it may be "directly connected" to the other element or "electrically connected" to the other element in a state in which intervening elements are present. In addition, it will be understood that when a unit is referred to as "comprising" another element, it may not exclude the other element but may further include the other element unless specifically oppositely indicates.

In the present specification, the terms such as "comprise" or "include" should not be construed as necessarily including various elements or processes described in the specification, and it should be construed that some of the elements or the processes may not be included, or additional elements or processes may be further included.

It is obvious that the following embodiments of the inventive concept are to specify the inventive concept but do not limit or define the scope of the inventive concept. Details that are easily derivable by one of ordinary skill in the art to which the inventive concept pertains based on the detailed description of the inventive concept and embodiments of the inventive concept are construed as being in the scope of the inventive concept. Hereinafter, the inventive concept will be described in detail with reference to the attached drawings below based on examples that are just for illustration, without limiting the inventive concept.

Figure 1:
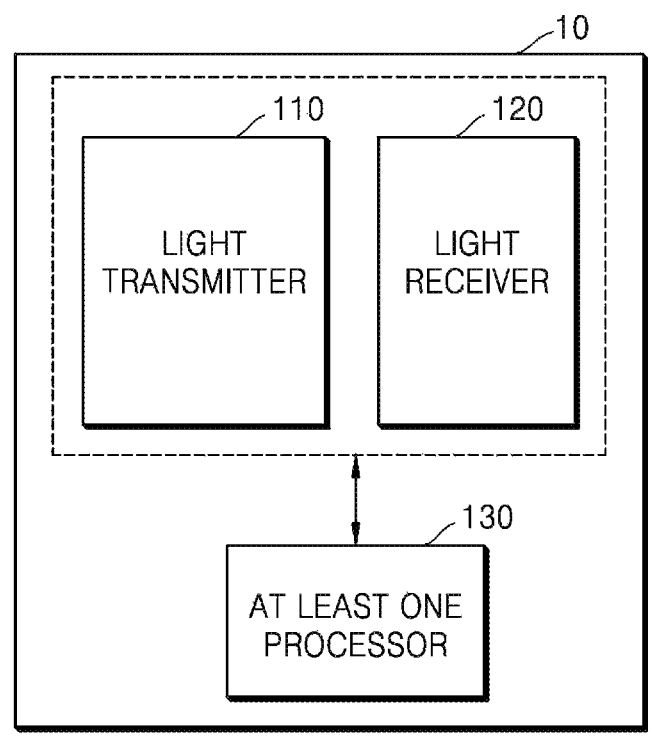
FIG. 1 is a block diagram of a light detection and ranging (LiDAR) apparatus according to an example embodiment.

FIG. 1 is a block diagram of a light detection and ranging (LiDAR) apparatus 10 according to an example embodiment.

Referring to FIG. 1, the LiDAR apparatus 10 may include a light transmitter 110, a light receiver 120, and at least one processor 130. However, this is merely an example embodiment, and it will be understood by one of ordinary skill in the art that the LiDAR apparatus 10 may further include additional and/or alternative components other than the components depicted in FIG. 1. For example, the LiDAR apparatus 10 may further include a memory.

The memory may be provided as a hardware component to store various data processed in the LiDAR apparatus 10. For example, the memory may store data that have been processed and/or data to be processed in the LiDAR apparatus 10. Also, the memory may store applications, drivers, and the like to be driven by the LiDAR apparatus 10.

The memory may include a random access memory (RAM) such as a dynamic random access memory (DRAM) or a static random access memory (SRAM), a read-only memory (ROM), an electrically erasable programmable read-only memory (EEPROM), a CD-ROM, a Blu-ray or another optical disk storage device, a hard disk drive (HDD), a solid state drive (SSD), or a flash memory. Furthermore, the memory may include another external storage device that may be accessed by the LiDAR apparatus 10.

The light transmitter 110 may include a light source configured to emit light. For example, the light source may be a device configured to emit light of an infrared ray band. When light of an infrared ray band is used, light that is mixed with natural light (e.g., sunlight) in a visible light band may be prevented. However, an example embodiment is not limited thereto. For example, the light transmitter 110 may include a light source that emits light of various wavelength bands and light of a plurality of wavelengths different from each other. Also, the light transmitter 110 may emit pulse light or continuous light.

The light transmitter 110 may include a light source, such as a laser diode (LD), an edge-emitting laser, a vertical-cavity surface emitting laser (VCSEL), a distributed feedback laser, a light emitting diode (LED), or a super luminescent diode (SLD), etc. However, an example embodiment is not limited thereto.

According to an example embodiment, the light transmitter 110 may irradiate a laser pulse generated based on a reference signal towards an object. The reference signal may determine a characteristic of the laser pulse irradiated towards the object. For example, the laser pulse may have an intensity or a frequency corresponding to an intensity or a frequency of the reference signal. The LiDAR apparatus 10 may change the characteristic of the laser pulse that is irradiated from the light transmitter 110 by controlling the characteristic of the reference signal. The laser pulse irradiated from the light transmitter 110 may be reflected after colliding with the object.

The light receiver 120 may include a receiving device that receives a laser pulse reflected by the object. The light receiver 120 may include a plurality of sensors configured to sense light. The light receiver 120 may obtain a measured signal from the received laser pulse. For example, the light receiver 120 may further include a photo-detector configured to convert the received laser pulse into an electrical signal, and the electrical signal outputted by the photo-detector may correspond to the measured signal. As an example, the photo-detector may include at least one of an avalanche photo-diode (APD) or a single photo avalanche diode (SPAD), but an example embodiment is not limited thereto.

The at least one processor 130 may perform functions for controlling the LiDAR apparatus 10. The at least one processor 130 may be realized by an array of a plurality of logic gates and may be realized by a combination of a general microprocessor and a memory in which a program to be executed in the general microprocessor is stored. Also, the at least one processor 130 may include both a signal processor configured to process an optical signal or an electrical signal and a computing unit configured to perform computations with respect to signal values indicated by signals.

The at least one processor 130 may detect a flight time of a laser pulse by using a correlation between a measured signal and a reference signal. The measured signal is a signal obtained by the light receiver 120 when a laser pulse generated based on a reference signal is reflected by an object. Thus, the measured signal may have characteristics that are the same as or similar to the characteristics of the reference signal. Accordingly, when a time at which the correlation between the measured signal and the reference signal increases is detected, a time at which a laser pulse irradiated from the light transmitter 110 is received by the light receiver 120 may be detected, and thus, a flight time of the laser pulse may be detected.

For example, the at least one processor 130 may calculate a cross correlation function between a measured signal and a reference signal. The cross correlation function is a function that shows the degree of correlation between two functions, and thus, the cross correlation function between the measured signal and the reference signal may output a value proportional to the correlation between the two signals. For example, assuming that the measured signal is $f_0(t)$ and the reference signal is $g_0(t)$, the cross correlation function between the measured signal and the reference signal may be calculated by Equation 1 as below.

$$\int_{-\infty}^{\infty} f_0(x) g_0(t+x) dx \quad \text{[Equation 1]}$$

The at least one processor 130 may determine a point at which a value of the calculated cross correlation function exceeds a preset critical value. The preset critical value may be determined by the at least one processor 130, but an example embodiment is not limited thereto. The preset critical value may be determined by an input from the outside. The at least one processor 130 may determine a time period from a time point when a laser pulse generated based on the reference signal is irradiated towards an object to a time point when a value of the calculated cross correlation function exceeds a preset critical value, and determine the time interval to be a flight time. Also, the at least one processor 130 may calculate a distance to the object by using a flight time of a laser pulse and a velocity of light. The method of calculating a distance by using the flight time of a laser pulse and the velocity of light (for example, a Time of Flight (ToF) method) is well known in the art, thus, the detailed descriptions thereof will be omitted.

The method of detecting a flight time of a laser pulse by using the cross correlation function uses an amplification effect through the correlation of a measured signal and a reference signal, and thus, the method may provide a high measurement accuracy even if the measured signal or the reference signal is a small signal.

However, when negative values are included in signal values representing measured signals or reference signals due to noise, oscillation, etc., the amplification effect of the calculated cross correlation function may be reduced. To prevent the reduction of amplification effect of the calculated cross correlation function due to noise, oscillation, or etc., the at least one processor 130 may convert the measured signal and the reference signal respectively into unipolar signals before detecting a flight time of a laser pulse by using the correlation between the measured signal and the reference signal. The unipolar signal has a concept opposite to a bipolar signal and may denote a signal having signal values of one of a negative polarity and a positive polarity.

Figure 2:
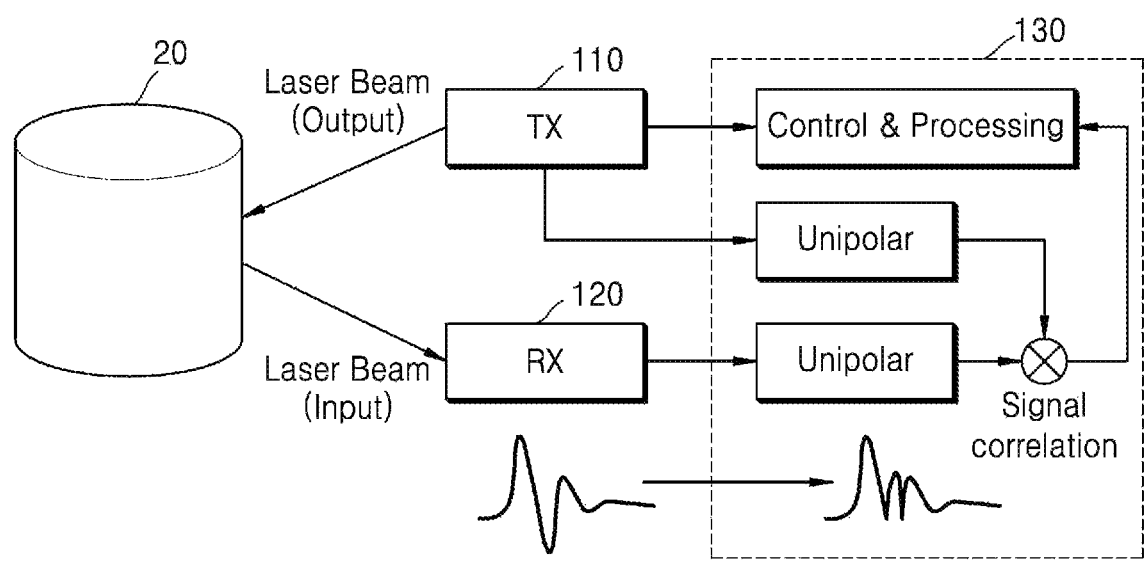
FIG. 2 is a schematic diagram for explaining a method of operating a LiDAR apparatus, according to an example embodiment.

FIG. 2 is a schematic diagram for explaining a method of operating the LiDAR apparatus 10, according to an example embodiment.

As described with reference to FIG. 1, the LiDAR apparatus 10 may include the light transmitter 110, the light receiver 120, and the at least one processor 130. Also, the light transmitter 110 may irradiate a laser pulse (or a laser beam (output)) generated based on a reference signal towards an object 20. The light receiver 120 may receive a laser pulse (or a laser beam (input)) reflected by the object 20 and may obtain a measured signal from the received laser pulse (or a laser beam (input)).

The LiDAR apparatus 10 may further include a high-pass filter configured to remove offset from a measured signal and an analog-digital converter (ADC) configured to quantize the measured signal from which the offset is removed. The at least one processor 130 may convert the measured signal into a unipolar signal based on an absolute value of at least a portion of signal values representing the quantized measured signals. As the offset is removed from the measured signal by the high-pass filter, the characteristics of the measured signal may not be changed in the process of converting the measured signal into the unipolar signal, and accordingly, the correlation between the measured signal and the reference signal may be accurately calculated. Also, the at least one processor 130 may convert the reference signal into a unipolar signal based on an absolute value of at least a portion of the signal values representing the reference signal.

However, an example embodiment is not limited thereto. The at least one processor 130 may convert the measured signal and the reference signal respectively into unipolar signals by using different methods other than the method of using an absolute value. For example, the at least one processor 130 may convert the measured signal and the reference signal respectively into unipolar signals by using a method in which all of signal values having values less than a specific value among signal values representing a measured signal or a reference signal are replaced with the specific value, or may convert the measured signal and the reference signal respectively into unipolar signals by using a method in which a square of signal values representing a measured signal or a reference signal is used.

The at least one processor 130 may calculate a cross correlation function between the measured signal and the reference signal that are converted into unipolar signals, may determine a point when a value of the calculated cross correlation function exceeds a preset critical value, and may determine a time period from a time point when a laser pulse generated based on a reference signal is irradiated towards the object 20 to a time point when a value of the calculated cross correlation function exceeds a preset critical value to be the flight time of a laser pulse. At this point, assuming that the converted measured signal is f(t) and the converted reference signal is g(t), the cross correlation function between the converted measured signal and the converted reference signal may be calculated by Equation 2 as below.

$$\int_{-\infty}^{\infty} f(x)g(t+x)dx \qquad \text{[Equation 2]}$$

In this manner, since the at least one processor 130 calculates the cross correlation function between the converted measured signal and the converted reference signal after converting the measured signal and the reference signal respectively into unipolar signals, even when negative values, such as noise, oscillation, etc. are included in the signal values representing the measured signal and the reference signal, the amplification effect of the calculated cross correlation function may not be reduced. Hereinafter, effects that may be generated according to the conversion of the measured signal and the reference signal respectively into a unipolar signal will be described in detail with reference to FIGS. 3 and 4.

Figure 3:
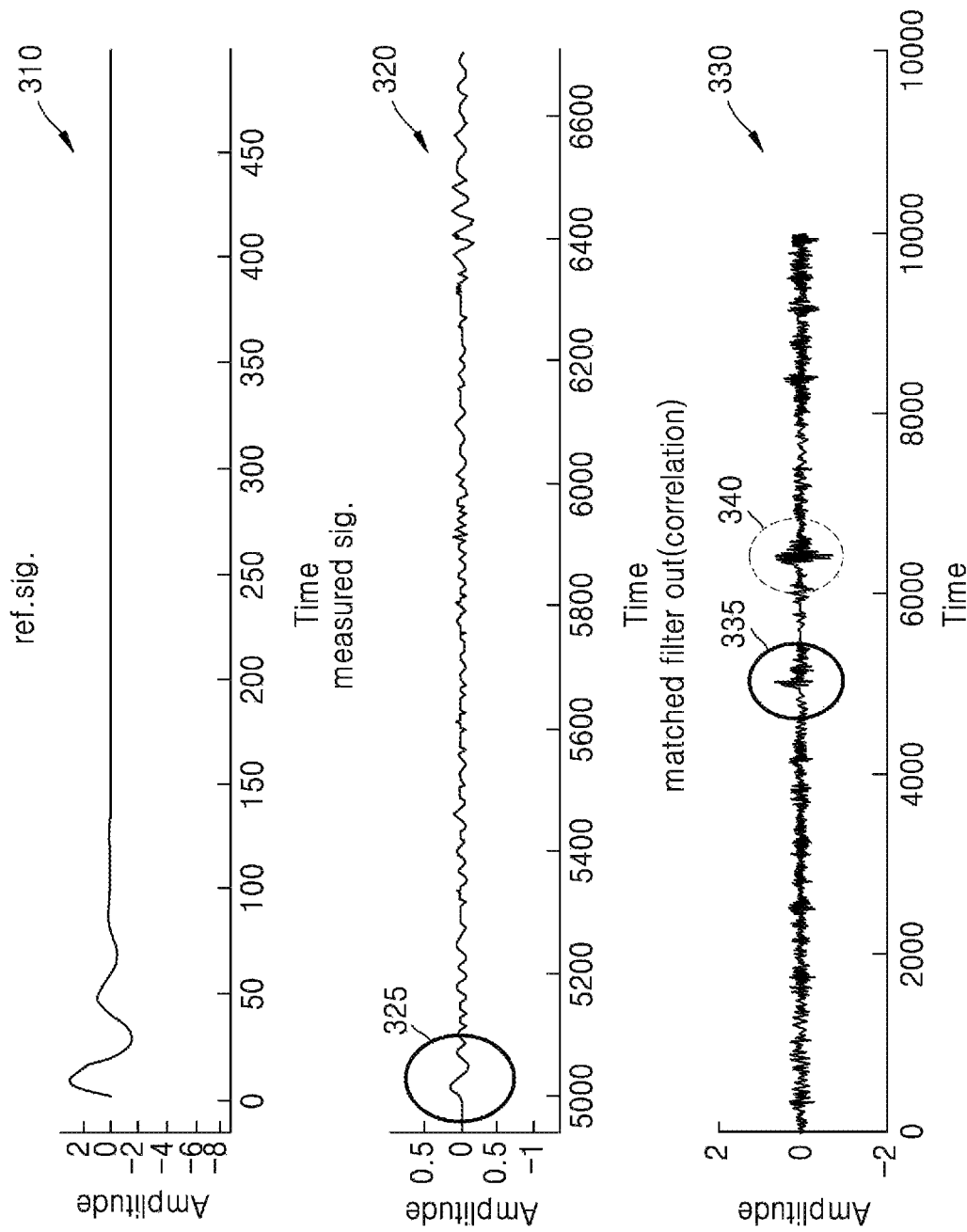
FIG. 3 shows a comparative example of detecting a flight time of a laser pulse.

FIG. 3 shows a comparative example of detecting a flight time of a laser pulse by using a correlation between a measured signal and a reference signal without converting the measured signal and the reference signal respectively into a unipolar signal.

Referring to FIG. 3, Graph 310 shows an amplitude of a reference signal according to time, Graph 320 shows an amplitude of a measured signal according to time, and Graph 330 shows a matched filter output of the measured signal and the reference signal according to time. The matched filter output of the measured signal and the reference signal may correspond to a value of a cross correlation function between the measured signal and the reference signal.

A laser pulse irradiated to an object from the light transmitter 110 is generated based on the reference signal, and referring to Graph 310, it is seen that a laser pulse is irradiated from the light transmitter 110 when t=0 ns. A location 325 on Graph 320 is a point at which a signal corresponding to the laser pulse generated by the reference signal is received and indicates a time section where the laser pulse reflected by the light receiver 120 is received. However, referring to Graph 320, it is seen that the measured signal has signal values that vibrate by noise, oscillation, etc. other than the section corresponding to the location 325.

Accordingly, as depicted in Graph 330, points where a value of the cross correlation function between the measured signal and the reference signal exceeds a preset critical value appear on a location 335 as well as a location 340. The location 335 corresponds to a time section where a laser pulse reflected by the light receiver 120 is received, but the location 340 does not correspond to the time section where the laser pulse reflected by the light receiver 120 is received. Due to the presence of the location 340, when a flight time of a laser pulse is detected by using the correlation function between the measured signal and the reference signal without converting the measured signal and the reference signal into unipolar signals, the measurement accuracy of the time section where the laser pulse reflected by the light receiver 120 is received may be reduced.

Figure 4:
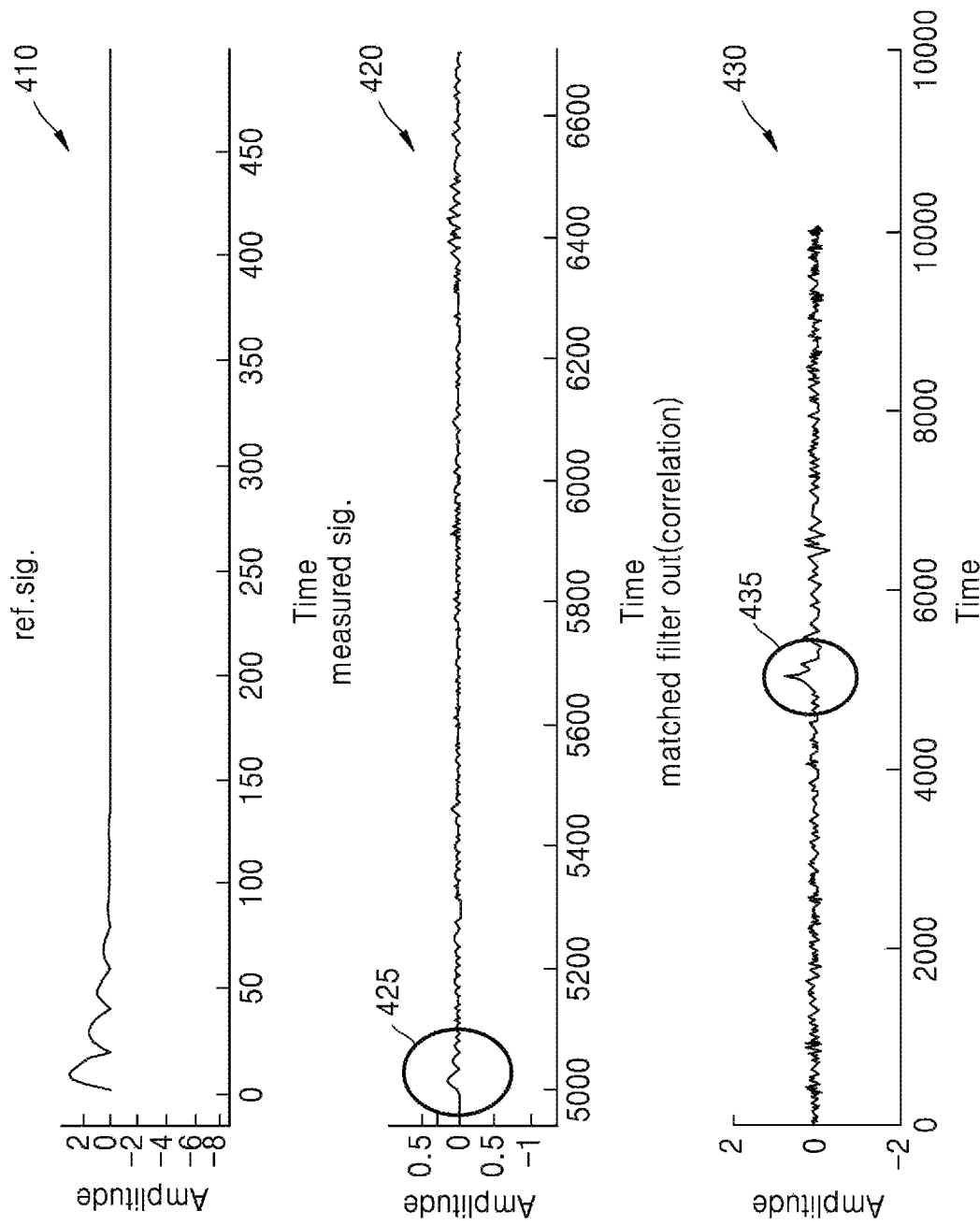
FIG. 4 shows an experimental example of detecting a flight time of a laser pulse according to an example embodiment.

On the other hand, FIG. 4 shows an experimental example of detecting a flight time of a laser pulse by using a correlation between a measured signal and a reference signal after converting the measured signal and the reference signal to unipolar signals, according to an example embodiment.

Referring to FIG. 4, Graph 410 shows an amplitude of a reference signal converted to a unipolar signal according to time, Graph 420 shows an amplitude of a measured signal converted to a unipolar signal according to time, and Graph 430 shows a matched filter output of the measured signal and the reference signal that are converted to unipolar signals according to time. The matched filter output of the converted measured signal and the converted reference signal may correspond to a value of a cross correlation function between the converted measured signal and the converted reference signal.

Graph 410 and Graph 420 respectively show the reference signal and the measured signal that are respectively converted into unipolar signals by, for example, using absolute values of the signal values of Graph 310 and Graph 320 of FIG. 3. Referring to Graph 420, a location 425 is a point at which a signal corresponding to the laser pulse generated by the reference signal is received and indicates a time section in which the laser pulse reflected by the light receiver 120 is received.

Referring to Graph 430, it is seen that a point at which a value of the cross correlation function between the measured signal and the reference signal exceeds a preset critical value is present only at the location 435. In this manner, when a flight time of a laser pulse is detected by using a correlation function between the measured signal and the reference signal after converting the measured signal and the reference signal respectively into unipolar signals, the amplification effect of the calculated cross correlation function between the measured signal and the reference signal may not be reduced even when the measured signal has signal values that vibrate by noise, oscillation, etc., and a point when the reflected laser pulse is received by the light receiver 120 may be accurately measured.

Referring back to FIG. 2, according to an example embodiment, in the case where a point at which a value of the calculated cross correlation function exceeds a preset critical value does not exist, the at least one processor 130 may increase the intensity of the reference signal. The case where a point at which the value of the calculated cross correlation function exceeds the preset critical value does not exist may denote that a point when the laser pulse received by the light receiver 120 is not detected even when the light transmitter 110 has irradiated the laser pulse toward the object, or may denote that the intensity of noise by a peripheral environment is greater than that of the measured signal. Accordingly, the at least one processor 130 may increase the intensity of the laser pulse generated based on the reference signal by increasing the intensity of the reference signal. Therefore, the at least one processor 130 may accurately detect the receiving point of a reflected laser pulse even in a noisy environment.

According to another example embodiment, when a point at which a value of the calculated cross correlation function exceeds a preset critical value does exist, the at least one processor 130 may control the light transmitter 110 so that the light transmitter 110 irradiates a laser pulse for a plurality of times towards the object 20, may obtain a plurality of measured signals from laser pulses reflected by the object 20, and may detect a flight time of the laser pulse by using the obtained plurality of measured signals. The at least one processor 130 may increase the number of population including measured signals through measuring a plurality of times and may perform a noise cancellation by using a technique, such as an averaging technique. Accordingly, a receiving time of a laser pulse reflected may be accurately detected even in a noisy environment.

Figure 5:
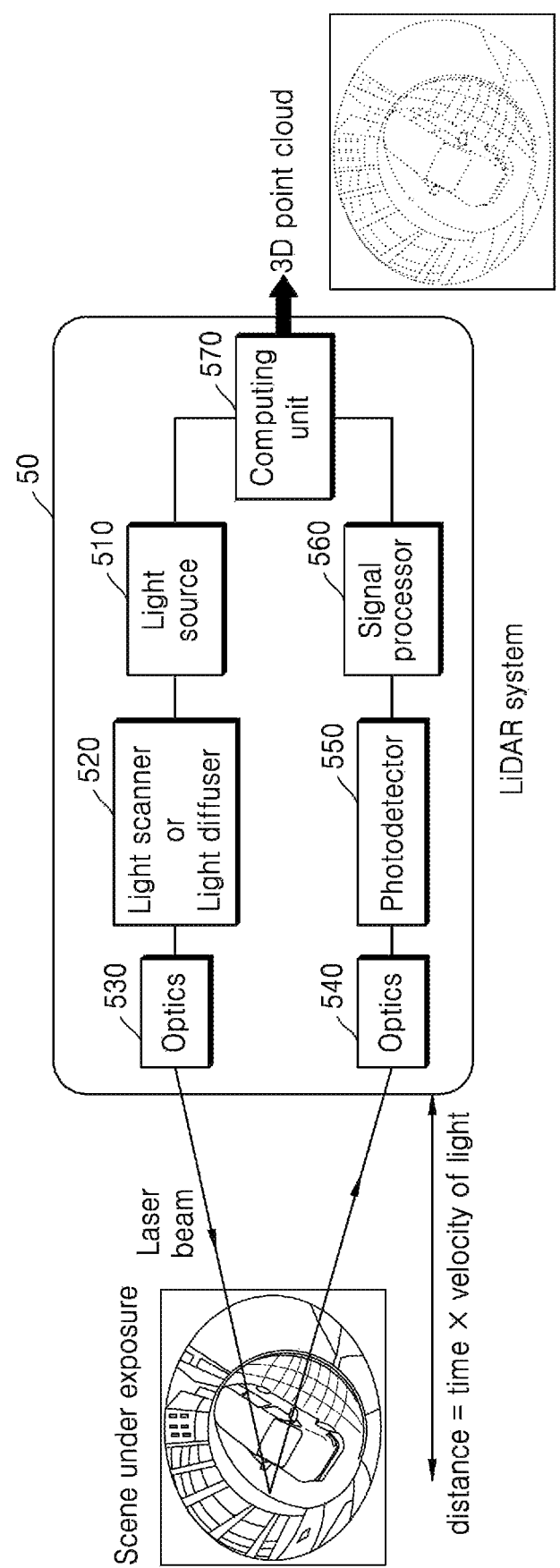
FIG. 5 is a diagram of a LiDAR apparatus according to another example embodiment.

FIG. 5 is a diagram of a LiDAR apparatus 50 according to another example embodiment.

According to an example embodiment, the LiDAR apparatus 50 may be a LiDAR system arranged on autonomous vehicles or arranged on vehicles that employ advanced driver assistance systems (ADAS). However, an example embodiment is not limited thereto. That is, it may be easily understood by those of ordinary skill in the art that the LiDAR apparatus 50 may be applied to various fields, for example, aerospace planes, geology, three-dimensional maps, robots, drones, etc. The LiDAR apparatus 50 may obtain information about exposed surrounding views or sceneries by using a laser beam and may form a three-dimensional point cloud about the exposed surrounding views or sceneries based on the obtained information.

Referring to FIG. 5, the LiDAR apparatus 50 may include a light source unit 510, a light scanner or a light diffuser 520, a first optical lens 530, a second optical lens 540, a photo-detector 550, a signal processor 560, and a computing unit 570. The light source unit 510, the light scanner or a light diffuser 520, and the first optical lens 530 of FIG. 5 may correspond to the light transmitter 110 of FIGS. 1 and 2, the second optical lens 540 and the photo-detector 550 of FIG. 5 may correspond to the light receiver 120 of FIGS. 1 and 2, and the signal processor 560 and the computing unit 570 of FIG. 5 may correspond to the at least one processor 130 of FIGS. 1 and 2, and thus, repeating descriptions may be omitted.

The light source unit 510 may include a plurality of light sources and may be configured to irradiate light for analyzing a location or a shape of an object. The light source unit 510 may generate and irradiate light of a predetermined wavelength, for example, a wavelength band suitable for analyzing a location or a shape of an object. The light source unit 510 may irradiate light of a plurality of wavelength bands different from each other. Also, the light source unit 510 may generate and irradiate pulse light or continuous light.

The light source unit 510 may irradiate light towards an object under the control of a processor. For example, the processor may set an irradiation direction or an irradiation angle of light from each of the light sources and may control the light source unit 510 so that the light source unit 510 irradiates light according to the set irradiation direction and angle of each of the light sources. The processor may have a configuration to control overall operations of the LiDAR apparatus 50 and may correspond to the at least one processor 130 of FIGS. 1 and 2.

The light scanner or the light diffuser 520 may collimate light emitted from the light source unit 510 towards an object and may time-sequentially control aiming directions of point-light emitted from the light source unit 510 to scan the whole object. A scanning mirror or an optical phased array may be used as the light scanner or the light diffuser 520. Light collimated from the light scanner or the light diffuser 520 may be irradiated towards an object through the first optical lens 530. Light reflected by the object may be received by the photo-detector 550 through the second optical lens 540.

The photo-detector 550 may include a plurality of pixelated regions that may separately detect light reflected from the object according to locations. For example, the photo-detector 550 may include a detector array divided by a plurality of pixels. A light detecting element may be arranged in each of the plurality of pixels. The light detecting element may be a sensor configured to sense light, for example, a light receiving diode configured to generate an electrical signal by light energy. The light detecting elements may form pixels according to locations in the detector array, and each of the pixels may separately detect reflection light according to irradiation angles of light irradiated from the light source unit 510.

The signal processor 560 and the computing unit 570 may compute a flight time of light from reflection light detected by the photo-detector 550. The method of computing a flight time of light, performed by the signal processor 560 and the computing unit 570, has been described with reference to FIGS. 1 and 2, thus, repeated descriptions will be omitted. The signal processor 560 and the computing unit 570 may compute a distance to an object from the flight time and may generate a depth image or a three-dimensional (3D) point cloud with respect to the object by using the computed distance to each location of the object.

Figure 6:
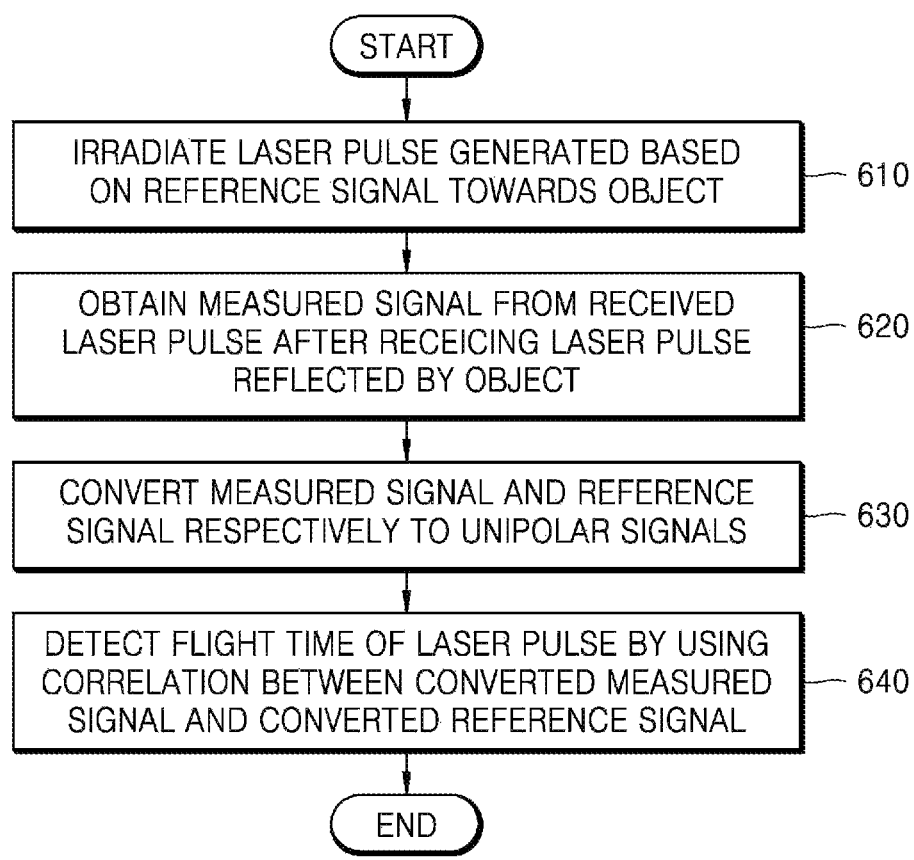
FIG. 6 is a flowchart of a method of operating a LiDAR apparatus, according to an example embodiment.

FIG. 6 is a flowchart of a method of operating a LiDAR apparatus, according to an example embodiment.

Referring to FIG. 6, the method of operating the LiDAR apparatus includes operations time-sequentially processed in the LiDAR apparatuses 10 and 50. Accordingly, descriptions made above with reference to FIGS. 1 through 5 even when the descriptions are omitted below may be applied to the method of operating the LiDAR apparatus of FIG. 6.

In operation 610, the LiDAR apparatus may irradiate a laser pulse generated based on a reference signal towards an object. The reference signal may determine characteristics of the laser pulse irradiated towards the object. For example, the irradiated laser pulse may have an intensity or frequency corresponding to the intensity or frequency of the reference signal. The LiDAR apparatus may change the characteristics of the irradiated laser pulse by controlling the characteristics of the reference signal.

In operation 620, the LiDAR apparatus may receive a laser pulse reflected by the object and may obtain a measured signal from the received laser pulse. For example, the LiDAR apparatus may obtain a measured signal by using a light detector configured to convert the received laser pulse into an electrical signal. The electrical signal that is output by the light detector may correspond to the measured signal.

In operation 630, the LiDAR apparatus may convert the measured signal and the reference signal respectively into unipolar signals. For example, the LiDAR apparatus may remove an offset from the measured signal by passing the measured signal through a high-pass filter, may quantize the measured signal from which the offset is removed, and may convert the measured signal into a unipolar signal based on an absolute value of at least a portion of signal values representing the quantized measured signals. As the offset is removed from the measured signal by the high-pass filter, the characteristics of the measured signal may not be changed in the process of converting the measured signal into the unipolar signal, and accordingly, the correlation between the measured signal and the reference signal may be accurately obtained. Also, the LiDAR apparatus may convert the reference signal into a unipolar signal based on an absolute value of at least a portion of the signal values representing the reference signal.

In operation 640, the LiDAR apparatus may detect a flight time of a laser pulse by using a correlation between the converted measured signal and the reference signal. For example, the LiDAR apparatus may calculate a cross correlation function between the converted measured signal and the converted reference signal and may determine a point at which the value of the calculated cross correlation function exceeds a preset critical value. The LiDAR apparatus may determine a time period from the point of irradiating a laser pulse generated based on the reference signal towards an object to a point when a value of the calculated cross correlation function exceeds the preset critical value to be a flight time.

In this manner, when the flight time of a laser pulse is detected by using the correlation between the measured signal and the reference signal after converting the measured signal and the reference signal into unipolar signals, the amplification effect of the calculated cross correlation function between the measured signal and the reference signal may not be reduced even when the measured signal has signal values that vibrate due to noise, oscillation, etc., and a point when the reflected laser pulse is received by the LiDAR apparatus may be accurately measured.

According to an example embodiment, in the case where a point at which a value of the calculated cross correlation function exceeds a preset critical value does not exist, the LiDAR apparatus may increase the intensity of the reference signal. The case where a point at which the value of the calculated cross correlation function exceeds the preset critical value does not exist may denote that the intensity of noise by a peripheral environment is greater than that of the measured signal. Accordingly, the LiDAR apparatus according to an example embodiment may increase the intensity of the laser pulse generated based on the reference signal by increasing the intensity of the reference signal. Therefore, the LiDAR apparatus may accurately detect the receiving point of a reflected laser pulse even in a noisy environment.

According to another example embodiment, when the point at which a value of the calculated cross correlation function exceeds a preset critical value does not exist, the LiDAR apparatus may irradiate a laser pulse a plurality of times towards an object, may obtain a plurality of measured signals from the laser pulses reflected by the object, and may detect a flight time of a laser pulse by using the obtained plurality of measured signals. The LiDAR apparatus may increase the number of population including the measured signals through a plurality of measurements and may remove noise by using a technique, such as an averaging technique. Accordingly, a receiving point of the reflected laser pulse may be accurately detected even in a noisy environment.

The method of operating the LiDAR apparatus described above may be implemented as a non-transitory computer-readable recording medium in which at least one program including commands for executing the method is recorded. Examples of the non-transitory computer-readable recording medium may include magnetic recording media (e.g., hard disks, floppy disks, and magnetic tapes), optical recording media (e.g., CD-ROMs and Digital Versatile Discs (DVDs)), magneto-optical media (e.g., floptical disks), and hardware devices specially configured to store and perform program commands, such as a ROM, a RAM, and a flash memory. Examples of program instructions include not only machine code produced by a compiler, but also high-level language code that may be executed by a computer using an interpreter.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing steps may employ any number of related art techniques for electronics configuration, signal processing and/or control, data processing and the like.

While a few example embodiments have been described above, the scope of the disclosure is not limited thereto and various modifications and improvements made by those of ordinary skill in the art to concepts defined in the following claims should be understood to fall within the scope of the disclosure.

What is claimed is:

1. A light detection and ranging (LiDAR) apparatus, comprising:
    a light transmitter configured to irradiate a laser pulse towards an object, the laser pulse being generated based on a reference signal;
    a light receiver configured to receive the laser pulse reflected from the object and configured to obtain a first signal from the received laser pulse; and
    at least one processor configured to convert the first signal into a first unipolar signal and covert the reference signal into a second unipolar signal and configured to detect a flight time of the laser pulse by determining, based on a correlation between the first unipolar signal of the converted first signal and the second unipolar signal of the converted reference signal, a time of receiving, at the light receiver, the laser pulse reflected from the object,
    wherein the at least one processor is further configured to obtain a cross correlation function between the first unipolar signal of the converted first signal and the second unipolar signal of the converted reference signal, and detect the flight time based on a time period from a time point at which the laser pulse generated based on the reference signal is irradiated towards the object to a time point at which a value of the cross correlation function exceeds a preset critical value.

2. The LiDAR apparatus of claim 1, further comprising:
a high-pass filter configured to remove an offset from the first signal; and
an analog-digital converter (ADC) configured to quantize the first signal from which the offset is removed,
wherein the at least one processor is further configured to convert the first signal into a unipolar signal based on an absolute value of at least a portion of signal values representing the quantized first signal.

3. The LiDAR apparatus of claim 1, wherein the at least one processor is further configured to convert the reference signal into a unipolar signal based on an absolute value of at least a portion of signal values representing the reference signal.

4. The LiDAR apparatus of claim 1, wherein the at least one processor is further configured to obtain the cross correlation function between the converted first signal and the converted reference signal by using the following equation:

$$\int_{-\infty}^{\infty} f(x)g(t+x)dx,$$

wherein f(t) denotes the converted first signal and g(t) denotes the converted reference signal.

5. The LiDAR apparatus of claim 1, wherein, in response to non-existence of the time point at which the value of the cross correlation function exceeds the preset critical value, the at least one processor is further configured to increase an intensity of the reference signal.

6. The LiDAR apparatus of claim 1, wherein, in response to non-existence of the time point at which the value of the cross correlation function exceeds the preset critical value, the at least one processor is further configured to:
control the light transmitter to irradiate laser pulses a plurality of times towards the object,
obtain a plurality of first signals from the laser pulses reflected from the object, and
detect the flight time of the laser pulse based on the plurality of first signals.

7. The LiDAR apparatus of claim 1, wherein the light transmitter comprises a photo-detector configured to obtain the first signal by converting the received laser pulse into an electrical signal.

8. The LiDAR apparatus of claim 7, wherein the photo-detector comprises at least one of an avalanche photo-diode (APD) and a single photo avalanche diode (SPAD).

9. The LiDAR apparatus of claim 1, wherein the at least one processor is further configured to obtain a distance to the object by using the detected flight time and a velocity of light.

10. A method of operating a light detection and ranging (LiDAR) apparatus, the method comprising:
irradiating a laser pulse towards an object, the laser pulse being generated based on a reference signal;
obtaining a first signal from the laser pulse reflected from the object;
converting the first signal into a first unipolar signal and covert the reference signal into a second unipolar signal; and
detecting a flight time of the laser pulse by determining, based on a correlation between the first unipolar signal of the converted first signal and the second unipolar signal of the converted reference signal, a time of receiving, at the light receiver, the laser pulse reflected from the object,
wherein the detecting comprises:
obtaining a cross correlation function between the first unipolar signal of the converted first signal and the second unipolar signal of the converted reference signal; and
detecting the flight time based on a time period from a time point at which the laser pulse generated based on the reference signal is irradiated towards the object to a time point at which a value of the cross correlation function exceeds a preset critical value.

11. The method of claim 10, wherein the converting comprises:
removing an offset from the first signal by using a high-pass filter;
quantizing the first signal from which the offset is removed by using an analog-digital converter (ADC); and
converting the first signal into a unipolar signal based on an absolute value of at least a portion of signal values representing the quantized first signal.

12. The method of claim 10, further comprising increasing an intensity of the reference signal in response to non-existence of the time point at which the value of the cross correlation function exceeds the preset critical value.

13. The method of claim 10, further comprising:
irradiating laser pulses a plurality of times towards the object in response to non-existence of the time point at which the value of the cross correlation function exceeds the preset critical value;
obtaining a plurality of first signals from the laser pulses reflected from the object; and
detecting the flight time of the laser pulse by using the plurality of first signals.

14. A non-transitory computer readable storage medium having stored therein one or more instructions that are executable by a processor, to perform:
obtaining a first signal from a laser pulse irradiated to and reflected from an object, the laser pulse being generated based on a reference signal;
converting the first signal into a first unipolar signal and covert the reference signal into a second unipolar signal; and
detecting a flight time of the laser pulse by determining, based on a correlation between the first unipolar signal of the converted first signal and the second unipolar signal of the converted reference signal, a time of receiving, at the light receiver, the laser pulse reflected from the object,
wherein the detecting comprises:
obtaining a cross correlation function between the first unipolar signal of the converted first signal and the second unipolar signal of the converted reference signal; and
detecting the flight time based on a time period from a time point at which the laser pulse generated based on the reference signal is irradiated towards the object to a time point at which a value of the cross correlation function exceeds a preset critical value.

* * * * *